(12) United States Patent
Gupta et al.

(10) Patent No.: US 8,043,990 B2
(45) Date of Patent: Oct. 25, 2011

(54) CATALYST SYSTEM FOR POLYMERIZATION OF OLEFINS

(75) Inventors: Virendrakumar Gupta, Mumbai (IN);
Harshad Ramdas Patil, Mumbai (IN);
Dhananjay Ghelabhai Naik, Mumbai (IN); Sukhdeep Kaur, Mumbai (IN);
Gurmeet Singh, Mumbai (IN);
Priyanshu Bharatkumar Vyas, Mumbai (IN)

(73) Assignee: Reliance Industries Limited, Mumbai (IN)

( * ) Notice: Subject to any disclaimer, the term of this patent is extended or adjusted under 35 U.S.C. 154(b) by 0 days.

(21) Appl. No.: 12/989,775

(22) PCT Filed: Aug. 25, 2008

(86) PCT No.: PCT/IN2008/000534
§ 371 (c)(1),
(2), (4) Date: Oct. 26, 2010

(87) PCT Pub. No.: WO2009/141831
PCT Pub. Date: Nov. 26, 2009

(65) Prior Publication Data
US 2011/0046326 A1  Feb. 24, 2011

(30) Foreign Application Priority Data
May 21, 2008 (IN) .................. 1074/MUM/2008

(51) Int. Cl.
*B01J 31/00* (2006.01)
*B01J 27/24* (2006.01)
*B01J 21/00* (2006.01)
*C08F 4/42* (2006.01)
*C08F 4/06* (2006.01)
*C08F 2/00* (2006.01)
*C08F 26/06* (2006.01)

(52) U.S. Cl. ........ 502/123; 502/127; 502/158; 502/167; 502/200; 502/232; 526/126; 526/147; 526/213; 526/217; 526/265

(58) Field of Classification Search .................. 526/147, 526/141, 213, 128; 502/23, 158, 127
See application file for complete search history.

(56) References Cited

U.S. PATENT DOCUMENTS

| | | | | |
|---|---|---|---|---|
| 4,107,414 A | * | 8/1978 | Giannini et al. | 526/114 |
| 5,061,667 A | * | 10/1991 | Murata et al. | 502/116 |
| 5,102,842 A | * | 4/1992 | Smith et al. | 502/124 |
| 5,710,229 A | * | 1/1998 | Garoff et al. | 526/348 |
| 2003/0060581 A1 | * | 3/2003 | Morini et al. | 526/125.3 |
| 2007/0032375 A1 | | 2/2007 | Campbell, Jr. et al. | |
| 2007/0032376 A1 | * | 2/2007 | Chen | 502/103 |

OTHER PUBLICATIONS

International Search Report dated Dec. 18, 2009 for related International Application No. PCT/IN2008/000534.

* cited by examiner

*Primary Examiner* — David W Wu
*Assistant Examiner* — Elizabeth Eng
(74) *Attorney, Agent, or Firm* — Klein, O'Neill & Singh, LLP

(57) ABSTRACT

The invention relates to a catalyst system for polymerization of olefins, the catalyst system comprising a titanium-containing procatalyst carrying internal electron donor(s), an organoaluminium cocatalyst and a mixture of external electron donors, the mixture comprising a carboxylic acid ester or derivatives thereof, an alkoxy silane and a nitrogen based compound. The invention also relates to a process for polymerization of olefin(s) and to the polyolefin synthesized by the process.

13 Claims, No Drawings

CATALYST SYSTEM FOR POLYMERIZATION OF OLEFINS

FIELD OF INVENTION

The invention relates to a catalyst system for polymerization of olefins. The invention also relates to a process for polymerization of olefins using the catalyst system and to the polyolefin prepared by the process.

BACKGROUND

Polymerization of olefins is usually carried out in the presence of a catalyst system containing a Ziegler-Natta type procatalyst carrying internal electron donor(s), an organo aluminium cocatalyst and an external electron donor. Depending upon the kind of internal electron donor used, the polymerization catalyst systems could either be (a) a monoester based catalyst system or (b) a diester based catalyst system.

Monoester based catalyst systems use monoester of aromatic carboxylic acids as internal electron donors. When a monoester based catalyst system is used, the polypropylene productivity is usually low to moderate and polymers having relatively high polydispersity are formed. However, the extent of kinetic control achieved for the polymerization reaction, using such catalyst systems, is high, thus avoiding run away reactions leading to chunk formation. In most cases, monoester based catalyst systems provide polymerization reactions that are self extinguishing in nature i.e polymerization activity reduces with increasing temperature of the reaction.

Diester based catalyst systems typically use diester of aromatic carboxylic acids as internal electron donor. Polymer productivity using such catalyst systems is relatively high. When diester based catalyst system is used, olefins are usually formed with low to medium polydispersity. It is, however, difficult to achieve adequate kinetic control of the polymerization reaction using such catalyst systems.

Catalyst systems that provide combined advantages of monoester based catalyst systems as well as diester based catalyst systems are highly desired. Use of mixture of external electron donors is known to be advantageous in increasing the productivity of polymerization reactions in monoester based catalyst systems and in controlling the kinetics of polymerization reactions in diester based catalyst systems. US 2007/0032376 discloses a monoester based catalyst system comprising an external donor mixture of paraethoxy ethyl benzoate and a silane compound. The catalyst system comprising the external donor mixture show improved activity as compared to the catalyst system containing paraethoxy ethyl benzoate alone as the external electron donor. However, polydispersity of polypropylene synthesized using the monoester based catalyst system need to be lowered further.

US 2007/0032375 disclose diester based catalyst system wherein a external donor mixture of a silane compound and aromatic carboxylic acid ester is used. Better control is achieved in reaction kinetics of the polymerization reaction by the use of the mixture of external electron donors, as compared to the control achieved by the use of a catalyst system having silane alone as the external electron donor. However, there is scope for improvement in the kinetic control achieved using the diester based catalyst systems.

DETAILED DESCRIPTION

Accordingly, the invention provides a catalyst system for polymerization of olefins, the catalyst system comprising a mixture of external electron donors, the mixture comprising para isopropoxy ethyl benzoate, an alkoxy silane and a nitrogen based compound.

In one embodiment, the invention provides a catalyst system for polymerization of olefins, the catalyst system comprising a titanium-containing procatalyst carrying internal electron donor(s), an organoaluminium cocatalyst and a mixture of external electron donors, the mixture comprising a carboxylic acid ester or derivatives thereof, an alkoxy silane and a nitrogen based compound.

In another embodiment, the invention provides a catalyst system for polymerization of olefins, the catalyst system comprising a titanium-containing procatalyst carrying internal electron donor(s), an organoaluminium cocatalyst and a mixture of external electron donors, the mixture comprising a carboxylic acid ester or derivatives thereof, an alkoxy silane and a nitrogen based compound, wherein the carboxylic acid ester is present in 70 to 85% by mole, the silane is present in 10 to 20% by mole and the nitrogen based compound is present in 0.5 to 10% by mole of the mixture.

In another embodiment, the invention provides a catalyst system for polymerization of olefins, the catalyst system comprising a titanium-containing procatalyst carrying internal electron donor(s), an organoaluminium cocatalyst and a mixture of external electron donors, the mixture comprising a carboxylic acid ester or derivatives thereof, an alkoxy silane and a nitrogen based compound, the catalyst system having an aluminium to external electron donor molar ratio in the range of 2 to 5 and aluminium to titanium molar ratio in the range of 40 to 260.

In another embodiment, the invention provides catalyst system for polymerization of olefins, the catalyst system comprising a titanium-containing procatalyst carrying monocarboxylic acid ester as internal electron donor(s), an organoaluminium cocatalyst and a mixture of external electron donors, the mixture comprising a carboxylic acid ester or derivatives thereof, an alkoxy silane and a nitrogen based compound.

In another embodiment, the invention provides a catalyst system for polymerization of olefins, the catalyst system comprising a titanium-containing procatalyst carrying dicarboxylic acid ester as internal electron donor(s), an organoaluminium cocatalyst and a mixture of external electron donors, the mixture comprising a carboxylic acid ester or derivatives thereof, an alkoxy silane and a nitrogen based compound.

In another embodiment, the invention provides a catalyst system for polymerization of olefins, the catalyst system comprising a titanium-containing procatalyst carrying internal electron donor(s), an triethyl aluminium cocatalyst and a mixture of external electron donors, the mixture comprising a carboxylic acid ester or derivatives thereof, an alkoxy silane and a nitrogen based compound.

In another embodiment, the invention provides a catalyst system for polymerization of olefins, the catalyst system comprising a titanium-containing procatalyst carrying internal electron donor(s), an organoaluminium cocatalyst and a mixture of external electron donors, the mixture comprising a carboxylic acid ester or derivatives thereof, an alkoxy silane and a nitrogen based compound wherein the carboxylic acid ester is para isopropoxy ethyl benzoate In another embodiment, the invention provides a catalyst system for polymerization of olefins, the catalyst system comprising a titanium-containing procatalyst carrying internal electron donor(s), an organoaluminium cocatalyst and a mixture of external electron donors, the mixture comprising a carboxylic acid ester or derivatives thereof, an alkoxy silane and a nitrogen based compound wherein the nitrogen based compound is 2,2,6,6-tetramethylpiperidine.

In another embodiment, the invention provides a catalyst system for polymerization of olefins, the catalyst system comprising a titanium-containing procatalyst carrying ethyl benzoate as internal electron donor(s), an organoaluminium cocatalyst and a mixture of external electron donors, the mixture comprising a carboxylic acid ester or derivatives thereof, an alkoxy silane and a nitrogen based compound.

In another embodiment, the invention provides a catalyst system for polymerization of olefins, the catalyst system comprising a titanium-containing procatalyst carrying internal electron donor(s), an organoaluminium cocatalyst and a mixture of external electron donors, the mixture comprising a carboxylic acid ester or derivatives thereof, an alkoxy silane and a nitrogen based compound wherein the alkoxy silane is cyclohexyl methyl dimethoxy silane In another embodiment, the invention provides a catalyst system for polymerization of olefins, the catalyst system comprising a titanium-containing procatalyst carrying diisobutyl phthalate as internal electron donor(s), an organoaluminium cocatalyst and a mixture of external electron donors, the mixture comprising a carboxylic acid ester or derivatives thereof, an alkoxy silane and a nitrogen based compound In another embodiment, the invention provides a process for polymerization of olefin, the process comprising contacting the olefin with a catalyst system comprising a titanium containing procatalyst carrying internal electron donor(s), an organoaluminium cocatalyst and a mixture of external electron donors, the mixture comprising a carboxylic acid ester or derivatives thereof, an alkoxy silane and a nitrogen based compound.

In another embodiment, the invention provides a process for polymerization of olefin, the process comprising contacting the olefin with a catalyst system comprising a titanium containing procatalyst carrying internal electron donor(s), an organoaluminium cocatalyst and a mixture of external electron donors, the mixture comprising a carboxylic acid ester or derivatives thereof, an alkoxy silane and a nitrogen based compound wherein productivity of the process is in the range of 4.0 to 35.0 kg polyolefin/gcat.

In a further embodiment, the invention provides a polyolefin having polydispersity in the range of 4.5 to 5.5.

The invention provides a catalyst system comprising a unique mixture of external electron donors that provide improved performance during olefin polymerization. The mixture of external electron donors comprise a carboxylic acid ester or derivatives thereof, an alkoxy silane and a nitrogenous compound. The carboxylic acid ester is an aromatic or aliphatic carboxylic acid ester. Examples of alkoxy silane electron donors include, but are not limited to, dicyclopentyldimethoxysilane, di-tert-butyldimethoxysilane, cyclohexylmethyldimethoxysilane, diphenyldimethoxysilane, diisopropyldimethoxysilane, di-n-propyldimethoxysilane, diisobutyldimethoxysilane, di-n-butyldimethoxysilane and n-propyltrimethoxysilane. For a monoester catalyst system, cyclohexylmethyldimethoxysilane is advantageously used as the alkoxy silane electron donor. The nitrogen based compound used as the external electron donor in the catalyst system of the invention can be an acyclic or heterocyclic nitrogen compound. Advantageously, the nitrogen based compound is a substituted heterocyclic nitrogen containing compound such as 2,2,6,6-tetra methyl piperidine.

In addition to the mixture of external electron donors, the catalyst system of the invention comprise a titanium-containing procatalyst carrying internal electron donor(s) and a cocatalyst. The procatalyst is a solid, usually comprising a transition metal compound supported on a magnesium compound. Advantageously, the procatalysts used in the catalyst system of the invention comprise a solid complex formed from a transition metal compound and a magnesium compound. More advantageously, the transition metal is titanium. The cocatalyst in the catalyst system of the invention is an organoaluminium compound. Amount of cocatalyst is so chosen as to have an aluminium to external donor molar ratio in the range of around 2 to 5 at which isotacticity of the synthesized polypropylene can be controlled. Advantageously, triethyl aluminium is used as the cocatalyst. The internal donor used in the catalyst system of the invention is a monocarboxylic acid ester or a dicarboxylic acid ester. Advantageously, the monocarboxylic acid ester is ethyl benzoate and the dicarboxylic acid ester is diisobutyl phthalate.

The invention also provides a process for polymerization of olefins using a catalyst system comprising a mixture of external electron donors. The process can be used for the synthesis of polyolefins having low polydispersity. The polymerization can be carried out in slurry phase, in gas phase or in bulk phase. The productivity of polyolefin varies in the range of 4 to 35 kg polyolefin/g cat depending on the phase in which the polymerisation is carried out. The polymerization is usually carried out under pressure and in the presence of hydrogen.

In the experiments that follow, the productivity of the catalyst system was measured based on the polymer yield and amount of catalyst used. Polydispersity of the polymer resins was measured by GPC (Gel Permeation Chromatography) instrument PL-GPC-220 at 145° C.

The invention is further illustrated by way of the following non limiting examples.

EXAMPLES

Example 1

Comparative Study of a Monoester Based Olefin Polymerization Catalyst System Using an External Electron Donor Mixture of Para Ethoxy Ethyl Benzoate and Cyclohexyl Methyl Dimethoxy Silane with that Using a External Electron Donor Mixture of 2,2,6,6 Tetramethyl Piperidine, Para Isopropoxy Ethyl Benzoate and Cyclohexyl Methyl Dimethoxy Silane The polymerization was carried out in the slurry phase using 65 to 70 g of a procatalyst having a composition of 2.8 to 3.4 wt % Ti, 17 to 18 wt % Mg, 14 to 16 wt % of ethyl benzoate (internal donor), 1.2 g of triethyl aluminium cocatalyst (diluted to 10 volume % in n-decane) and a mixture of external electron donors (as listed against experiment 1 and experiment 2 of table 1 and diluted to 5 volume % in n-decane). The procatalyst, the mixture of external donors and the cocatalyst were added along with n-hexane solvent into a preheated moisture-free stainless steel jacketed 3 liter semi batch stirred tank reactor containing a magnetic stirrer. Procatalyst and cocatalyst were added in such amounts as to have a cocatalyst/procatalyst molar ratio of 240 to 260 and a cocatalyst/external donor molar ratio of 3. 240 ml of hydrogen was also added into the reactor under ambient conditions. Propylene gas was introduced into the reactor, the reactor pressure was raised to 5.0 to 5.5 kg/cm$^2$ and the reactor temperature was raised to 68-72° C. Polymerization of propylene was carried out in the slurry phase for 1 hour maintaining reactor pressure of 5.0 to 5.5 kg/cm$^2$. After 1 hour of reaction, hexane was removed and polymer was collected/dried. Productivity of catalyst was calculated based on polymer yield and amount of catalyst used. The amount of catalyst was calculated following titanium estimation method. The polymerization productivity of the monoester catalyst systems in different experiments using different mixtures of external electron donors is given in table-1.

temperature was raised to 68-72° C. Polymerization of propylene was carried out in the slurry phase for 1 hour maintaining reactor pressure of 5.0 to 5.5 kg/cm². After 1 hour of reaction, hexane was removed and polymer was collected/dried. Productivity of catalyst was calculated based on polymer yield and amount of catalyst used. The amount of catalyst was calculated following titanium estimation method. The

TABLE 1

Comparison of productivity and polydispersity of monoester based catalyst systems for the polymerization of propylene using different mixtures of external electron donors

| Expt. No | Monoester catalyst system having external electron donor mixture of | Mole percentages of external electron donors in the mixture | MFI[†] of polypropylene (g/10 min) | Xylene solubility of polypropylene (wt %) | Productivity (kgPP/gcat) | Polydispersity |
|---|---|---|---|---|---|---|
| 1 | (a) Para-ethoxy ethyl benzoate/ (b) Cyclohexyl methyl dimethoxy silane | a:b = 84:16 | 2.9 | 2.5 | 4.4 | 6.1 |
| 2 | (a') 2,2,6,6 tetramethyl piperidine/(b') Para-isopropoxy ethyl benzoate/(c') Cyclohexyl methyl dimethoxy silane | a':b':c' = 08:78:14 | 2.8 | 2.4 | 4.3 | 4.5 |

[†]Melt Flow Index

From table 1, it is clear that the catalyst system of experiment 2 using a mixture of external electron donors provide polymer resins having low polydispersity. Further, the productivity of both the catalyst systems are comparable. The observed lowering of polydispersity is advantageous. The polyolefin resins having low polydispersity is better suited for various applications.

Example 2

Comparative Study of a Diester Based Olefin Polymerization Catalyst System Using an External Electron Donor Mixture of Para Ethoxy Ethyl Benzoate and Cyclohexyl Methyl Dimethoxy Silane with that Using a External Electron Donor Mixture of 2,2,6,6 Tetramethyl Piperdine, Para Isopropoxy Ethyl Benzoate and Cyclohexyl Methyl Dimethoxy Silane The polymerization was carried out in the slurry phase using 65 to 70 mg of a procatalyst having a composition of 2.5 to 3.0 wt % Ti, 17 to 18 wt % Mg, 12 to 14 wt % of diisobutyl phthalate (internal electron donor), 1.2 g of triethyl aluminium co-catalyst (diluted to 10 volume % in n-decane) and a mixture of external electron donors. The procatalyst, the cocatalyst and mixture of external electron donors (as listed against experiment 1 and experiment 2 of table 2 and diluted to 5 volume % in n-decane) were added along with n-hexane solvent into a preheated moisture-free stainless steel jacketed semi batch stirred tank reactor containing a magnetic stirrer. Procatalyst and cocatalyst were added in such amounts as to have a cocatalyst/procatalyst molar ratio of 240-260 and a cocatalyst/external donor molar ratio of 3. 240 ml of hydrogen was also added into the reactor at ambient condition. Propylene gas was introduced into the reactor, the reactor pressure was raised to 5.0 to 5.5 kg/cm² and the reactor polymerization activity of the diester based catalyst systems having two different mixtures of external electron donors is displayed in table-2.

TABLE 2

Comparison of activity of diester based catalyst systems for the polymerization of propylene using different mixtures of external electron donors

| Expt No | Catalyst system having external electron donor mixture of | Mole percentages of external electron donors in the mixture | Productivity of the catalyst system (kgPP/gcat) |
|---|---|---|---|
| 1 | (a) Para-ethoxy ethyl benzoate/(b)Cyclohexyl methyl dimethoxy silane | a:b = 84:16 | 5.5 |
| 2 | (a') 2,2,6,6 tetramethyl piperidine/(b') para-isopropoxy ethyl benzoate/(c')Cyclohexyl methyl dimethoxy silane | a':b':c' = 02:84:14<br>a':b':c' = 05:81:14<br>a':b':c' = 08:78:14 | 5.2<br>5.0<br>4.8 |

From table 2, it is clear that the catalyst systems of experiment 2 containing a mixture of external electron donors show lower polymer productivity as compared to the catalyst system of experiment 1. Lower productivity signifies better control over the reaction kinetics that enables to avoid run away reactions. The diester based/monoester based catalyst system of the invention containing a mixture of external electron donors exhibit enhanced performance in terms of enabling better kinetic control of the polymerization reaction and/or providing polyolefins having low polydispersity. The catalyst system of the invention, thus, assists in providing high quality polyolefin resins as well as avoids chunk formation during polymerization. Therefore, the polymerization is improved and waste formation is minimized.

The above description is illustrative only and is not limiting. The invention is defined by the claims that follow and their full range of equivalents.

The invention claimed is:

1. A catalyst system for polymerization of olefins, the catalyst system comprising a titanium-containing procatalyst carrying internal electron donor(s), an organoaluminium cocatalyst and a mixture of external electron donors, the mixture comprising a carboxylic acid ester or derivatives thereof, an alkoxy silane and a nitrogen based compound; wherein the carboxylic acid ester is present in 70 to 85% by mole, the silane is present in 10 to 20% by mole and the nitrogen based compound is present in 0.5 to 10% by mole of the mixture.

2. The catalyst system as claimed in claim 1 having aluminium to external electron donor molar ratio in the range of 2 to 5 and aluminium to titanium molar ratio in the range of 40 to 260.

3. The catalyst system as claimed in claim 1 wherein the internal electron donor is a monocarboxylic acid ester.

4. The catalyst system as claimed in claim 1 wherein the internal electron donor is a dicarboxylic acid ester.

5. The catalyst system as claimed in claim 1 wherein the cocatalyst is triethyl aluminum.

6. The catalyst system as claimed in claim 1 wherein the carboxylic acid ester is para isopropoxy ethyl benzoate.

7. The catalyst system as claimed in claim 1 wherein the nitrogen based compound is 2,2,6,6-tetramethylpiperidine.

8. The catalyst system as claimed in claim 3 wherein the monocarboxylic acid ester is ethyl benzoate.

9. The catalyst system as claimed in claim 1 wherein the alkoxy silane is cyclohexyl methyl dimethoxy silane.

10. The catalyst system as claimed in claim 4 wherein the dicarboxylic acid ester is diisobutyl phthalate.

11. A process for polymerization of olefin(s), the process comprising contacting the olefin(s) with the catalyst system as claimed in any one of the above claims.

12. The process as claimed in claim 11 having productivity in the range of 4 to 35 kg polyolefin/g cat.

13. The process as claimed in claim 11 carried out in slurry phase, in gas phase or in bulk phase.

* * * * *